J. HUNEKE.
CLUTCH.
APPLICATION FILED DEC. 2, 1907.

998,615.

Patented July 25, 1911.

UNITED STATES PATENT OFFICE.

JOHN HUNEKE, OF CHICAGO, ILLINOIS, ASSIGNOR TO COX MULTI-MAILER COMPANY, OF AUGUSTA, MAINE, A CORPORATION OF MAINE.

CLUTCH.

998,615.

Specification of Letters Patent.   Patented July 25, 1911.

Application filed December 2, 1907. Serial No. 404,833.

*To all whom it may concern:*

Be it known that I, JOHN HUNEKE, a citizen of the United States, residing at Chicago, in the county of Cook and State of Illinois, have invented certain new and useful Improvements in Clutches, of which the following is a specification.

This invention relates to improvements in clutches and the primary object of the same is to provide an improved clutch for connecting a driving and a driven member and which will yield when the movement of one of the members is retarded with relation to the movement of the other member to permit the said other member to move independently of the retarded member.

A further object is to provide improved locking devices for the members which are adapted to be automatically moved out of operative position and improved means for holding the devices in such position.

A further object is to provide an improved device of this character which will be simple, cheap and durable in construction, and effective and efficient in operation.

To the attainment of these ends and the accomplishment of other new and useful objects, as will appear, the invention consists in the features of novelty in the construction, combination and arrangement of the several parts hereinafter more fully described and claimed and shown in the accompanying drawing, illustrating the embodiment of the invention, and in which—

Figure 1:
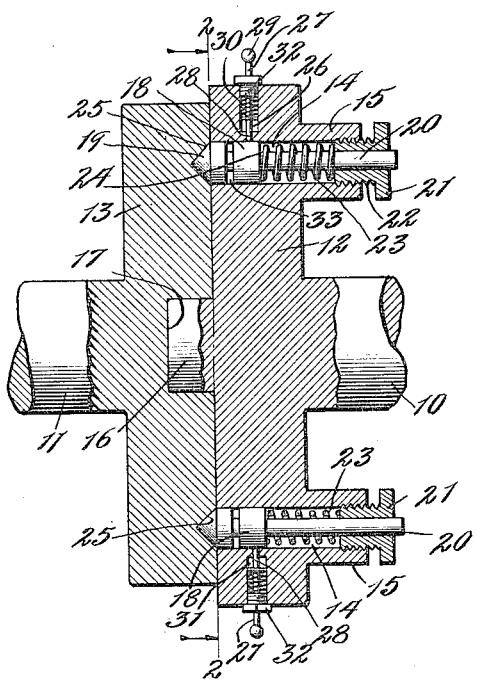
Figure 2:
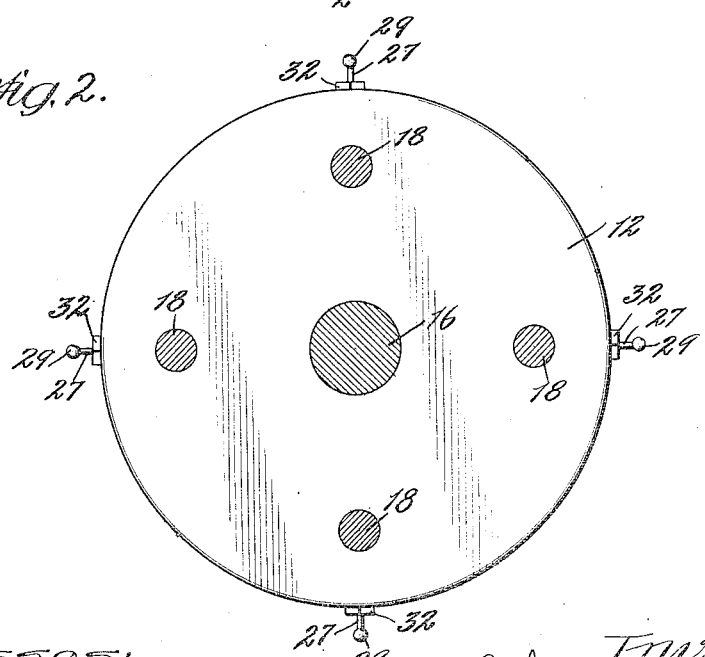

Figure 1 is a detail sectional view of an improved device of this character constructed in accordance with the principles of this invention. Fig. 2 is a detail sectional view on line 2—2 of Fig. 1.

Referring more particularly to the drawing, the numerals 10, 11 designate respectively the driving and the driven member which in the present exemplification of the invention are shown in the form of shafts, the adjacent extremities 12, 13 of which are of increased diameters and provided with flat faces resting against each other.

One of the members, preferably the member 10, is provided with transverse apertures 14 extending through the enlarged extremities 12 and surrounding the shaft, and the extremity is preferably provided with enlargements 15 extending beyond one face thereof and surrounding the apertures 14. One of the members is also provided with a cylindrical portion 16 projecting beyond the face of the enlarged extremity and adjacent the respective shaft and is adapted to enter a suitable recess 17 preferably arranged at the diametric center of the other member and said projecting portion 16 and recess 17 serve as means for supporting the adjacent extremities of the driving and driven members.

Arranged within and substantially filling the transverse apertures 14 in the extremity 12 are locking members 18, one extremity 19 of which is preferably conical and the other end is reduced as at 20 to form a stem which extends for some distance beyond the enlargement 15, and loosely surrounding the stem 20 is a nut or bushing 21, which is preferably provided with exterior screw threads 22 adapted to engage suitable interior threads in the enlargement 15. A suitable elastic member 23 is disposed between a shoulder 24 of the member 18 formed by the reduced portion or stem 20 and the extremity of the nut or bushing 21 and is preferably in the form of a coil spring which surrounds the stem 20 and is adapted to exert its tension on the shoulder 24 of the member 18 to normally hold the conical extremity 19 thereof projected beyond the face of the enlarged extremity 12 of the member 10.

The enlarged extremity 13 of the other member is provided with a conical recess 25 adapted to receive the conical extremity 19 of the member 18 to lock the members 10 and 11 together. Any desired number of these locking members 18 may be provided and arranged in any suitable manner about the member 10 and in the present exemplification of the invention four of such members are employed, and a corresponding number of recesses in the other member.

In use when the member 10 is rotated and the locking members 18 are in the position shown in Fig. 1 of the drawing, that is, with the conical extremities 19 thereof resting in the recesses 25, the member 11 will be simultaneously rotated therewith but if the rotation of the member 11 is retarded in any manner with relation to the rotation of the member 10, the locking members 18 will be automatically moved back into the apertures 14 against the tension of the yielding members 23 to permit the member 10 to rotate independently of the member 11. By adjusting the nut or bushing 21 the tension of the yielding member 23 may be varied according to the load on the member 11.

In order to prevent the locking members 18 from entering the next recess 25, when the movement of the member 11 is retarded and the member 10 rotated to prevent straining the member 11, any suitable means may be provided for locking the members 18 in such a position that the conical extremities thereof will not project beyond the face of the extremities 12. A suitable and efficient device for accomplishing this purpose will now be described: The extremity 12 of the member 10 is provided with apertures or recesses 26 which are arranged transversely to the aperture 14 and open through the periphery of the member 12 and communicate with the aperture 14. This aperture is provided with an enlarged portion adjacent the periphery of the member 12 and arranged in the aperture is a pin or bolt 27, one extremity 28 of which projects through the aperture 26 and into the aperture 14 and the other extremity projects beyond the periphery of the extremity 12 of the member 10 and is provided with an enlargement 29 which serves as a handle for operating the pin.

Arranged within the enlarged portion of the aperture 26 is a yielding member 30, preferably in the form of a coil spring, which surrounds the pin 27 and one extremity thereof engages a suitable pin or projection 31 arranged adjacent the extremity 28 of the pin and transversely thereof. The other extremity of the yielding member is adapted to engage an adjustable bushing 32 which surrounds the pin 28 and is preferably provided with a threaded periphery adapted to engage suitable screw threads in the aperture 26, so that the tension of the yielding member 30 may be varied.

The extremity 28 of the pin or bolt 27 is adapted to normally rest upon the locking member 18 when the conical extremity 19 thereof is in operative position, as shown in Fig. 1 of the drawing, and when the member 18 is moved against the tension of the yielding member 23 to cause the conical extremity 19 thereof to move out of the recess 25 in the other member, the extremity 28 of the bolt or pin will enter a circumferential groove or recess 33 in the member 18 and lock the member in its adjusted position to permit the member 10 to move independently of the member 11.

When it is desired to lock the members 10 and 11 together the pins or bolts 27 may be adjusted against the tension of the yielding members 30 to permit the tension of the yielding members 23 to project the conical extremities 19 beyond the face of the extremity 12 of the member 10.

In order that the invention might be fully understood by those skilled in the art, the details of the foregoing embodiment thereof have been thus specifically described, but

What I claim as new and desire to secure by Letters Patent is—

1. The combination of a driving and a driven member fixed with relation to each other and having contacting faces, the face of one of the members being provided with a beveled recess, a locking member supported by the other member to move in a plane lengthwise of the axis of rotation thereof, said locking member being adapted to project beyond the face of its supporting member to enter the said recess in the other member to lock the two members for movement together, means for holding the locking member normally projected beyond the respective face, said locking member being adapted to be automatically moved into an inoperative position and means for locking the member in said inoperative position.

2. The combination of a driving and a driven member fixed with relation to each other and having contacting faces, the face of one of the members being provided with a beveled recess, a locking member supported by and movable with respect to the other member and in a direction lengthwise of the action of rotation of the member, said locking member being adapted to project beyond the face of the member to enter the said recess in the other member to lock the two members for movement together, yielding means for holding the locking member normally projected beyond the face of its supporting member, means for varying the tension of said yielding means, said locking member being adapted to be automatically moved into an inoperative position, and means for locking the member in said inoperative position.

3. The combination of a driving and a driven member, fixed with relation to each other and having contacting faces, the face of one of the members being provided with a beveled recess, a locking member supported by and movable with respect to the other member and in a direction lengthwise of the axis of rotation of the member, said locking member being adapted to project beyond the face of the member to enter the said recess in the other member to lock the two members for movement together, yielding means for holding the locking member normally projected beyond the face of its supporting member, means for varying the tension of said yielding means, said locking member being adapted to be automatically moved into an inoperative position and being provided with a peripheral recess, and a locking element movable in a plane transverse to the plane of movement of the said locking member and adapted to enter the recess to automatically lock the said locking member in its inoperative position.

In testimony whereof I have signed my name to this specification, in the presence of two subscribing witnesses, on this 22nd day of November, A. D. 1907.

JOHN HUNEKE.

Witnesses:
 CHARLES H. SEEM,
 FRANCIS A. HOPKINS.